United States Patent
Sutardja

(10) Patent No.: US 7,675,826 B2
(45) Date of Patent: Mar. 9, 2010

(54) AUTOMATIC WRITE STRATEGY CALIBRATION METHOD FOR OPTICAL DRIVE

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 1082 days.

(21) Appl. No.: 11/337,332

(22) Filed: Jan. 23, 2006

(65) Prior Publication Data

US 2007/0070845 A1    Mar. 29, 2007

Related U.S. Application Data

(60) Provisional application No. 60/719,866, filed on Sep. 23, 2005, provisional application No. 60/760,304, filed on Jan. 19, 2006.

(51) Int. Cl.
G11B 7/00    (2006.01)

(52) U.S. Cl. .................. 369/47.53; 369/59.11

(58) Field of Classification Search ................ 369/47.5, 369/47.51, 47.52, 47.53, 59.11, 53.22, 59.12, 369/119

See application file for complete search history.

(56) References Cited

U.S. PATENT DOCUMENTS

| | | | |
|---|---|---|---|
| 5,416,806 A | | 5/1995 | Coker et al. |
| 7,038,982 B2 * | | 5/2006 | Schreurs et al. .......... 369/47.53 |
| 7,221,633 B2 * | | 5/2007 | Yamaguchi et al. ...... 369/53.22 |
| 7,263,050 B2 * | | 8/2007 | Liu et al. .................. 369/59.12 |
| 7,355,946 B2 * | | 4/2008 | Han et al. ................. 369/53.22 |
| 7,391,694 B2 * | | 6/2008 | Erickson et al. .......... 369/53.37 |
| 7,414,936 B2 * | | 8/2008 | Tasaka et al. ............. 369/47.51 |
| 7,450,482 B2 * | | 11/2008 | Lee et al. .................. 369/47.53 |
| 2003/0058765 A1 | | 3/2003 | Schreurs et al. |
| 2004/0160873 A1 | | 8/2004 | Pereira |
| 2005/0030860 A1 | | 2/2005 | Gage et al. |

FOREIGN PATENT DOCUMENTS

WO    WO 2005/064608 A2    7/2005

OTHER PUBLICATIONS

Tom Harris; "How CD Burners Work"; http://computer.howstuffworks.com/cd-burner.htm; Nov. 15, 2005; 11 pages.
Official Action including the Written Opinion and Search Report from the Intellectual Property Office of Singapore dated Sep. 27, 2007 for Application No. SG 200605785-5; 10 pgs.
U.S. Appl. No. 11/185,563, filed Jul. 20, 2005, Sutardja, Pantas.
Official Action including the Written Opinion and Search Report from the Intellectual Property Office of Singapore dated Sep. 27, 2007 for Application No. SG 200605785-5; 9 pgs.

* cited by examiner

*Primary Examiner*—Nabil Z Hindi

(57) ABSTRACT

A write strategy calibration system for an optical media playback device comprises memory for storing a write strategy table. A control module generates a write signal to write a training pattern to an optical storage medium according to calibration data stored in the write strategy table. A write strategy analysis module receives a read signal indicative of the training pattern written to the optical storage medium and adjusts the calibration data according to the read signal.

35 Claims, 10 Drawing Sheets

AUTOMATIC WRITE STRATEGY CALIBRATION METHOD FOR OPTICAL DRIVE

CROSS-REFERENCE TO RELATED APPLICATIONS

This application claims the benefit of U.S. Provisional Application No. 60/719,866, filed on Sep. 23, 2005. The disclosure of the above application is incorporated herein by reference in its entirety. This application also claim the benefit of U.S. Provisional Application No. 60/760,304, filed on Jan. 19, 2006.

FIELD

The present disclosure relates to optical media playback devices and media, and more particularly to calibrating a write strategy for optical media.

BACKGROUND

Optical media such as compact discs (CDs) and digital versatile discs (DVDs) store data that is read back optically. Optical discs typically include a substrate that is made of plastic and an alternating reflective/non-reflective layer that includes a continuous spiral track for encoding data. An optical media playback device passes a laser over the track to read the data. An optical sensor receives light that is reflected back from the encoded data on the track.

Referring now to FIG. 1, an exemplary one-time recordable disc (e.g. a CD-recordable disc/CD-R and/or a DVD-recordable disc/DVD+/−R) 10 typically includes a polycarbonate plastic substrate 12, a dye layer 14, and a reflective metal layer 16. For example, the reflective metal layer 16 may include an aluminum layer. When the disc 10 is blank, the dye layer 14 is translucent, and light shines through and reflects off the reflective metal layer 16. When writing to the disc 10 with a laser, selected portions of the dye layer 14 are heated at a particular intensity and frequency, which turns the selected portions opaque. The opaque portions of the dye layer 14 do not reflect light. The opaque, non-reflective portions of the dye layer 14 are referred to as "marks." Conversely, the translucent, reflective portions of the dye layer 14 are referred to as "spaces." The optical media playback device may include a read laser to read data from the disc 10 and a write laser to alter the dye layer 14 for recording purposes.

During read back, the optical disc is rotated by the optical media playback device, which typically includes at least one laser, a spindle motor, and an optical sensor. The spindle motor rotates the optical medium. The laser is directed onto the tracks of the optical medium and the optical sensor measures reflected light. When the optical sensor generates a high current level corresponding to high reflectivity (i.e. a space), the data may be interpreted as a "1" (or "0"). When the optical sensor generates a low current level corresponding to low reflectivity (i. e. a mark), the data may be interpreted as a "0" (or "1"). In some devices, the space/mark signal, or commonly described as converted non-return to zero inverted (NRZI) signal, may be converted to a non-return to zero (NRZ) signal, as shown in FIG. 2, where 1's represent transitions and 0's represent the absence of transitions.

Referring now to FIG. 3, an exemplary rewritable disc (e.g. a CD-rewritable disc/CD-RW and or a DVD-rewritable disc/DVD+/−RW) 20 typically includes a polycarbonate plastic substrate 22, dielectric layers 24, a phase change compound layer 26, and a reflective metal layer 28. The phase change compound layer 26, for example, may be a chemical compound of silver, antimony, tellurium, and/or indium. A laser is used to heat the compound above a crystallization temperature and/or a melting temperature. When cooled rapidly from above the melting temperature, the compound remains in a fluid, amorphous state, and results in a non-reflective portion (i.e. a mark). Conversely, when maintained at the crystallization temperature for a certain length of time, the compound returns to a solid state before cooling down, and results in a reflective portion (i.e. a space). Therefore, in addition to a read laser, the optical media playback device may include a write laser that is powerful enough to heat the compound above the melting temperature and an erase laser that is powerful enough to heat the compound above the crystallization temperature.

In either one-time recordable disc or rewritable disc applications, the write process is non-linear. The marks (and spaces, in the rewritable disc application) are created according to focused heat from the write and/or erase laser. As such, heat diffusion and phase-change problems may occur at high rotational speeds of the moving optical media.

Referring now to FIGS. 4A through 4D, exemplary laser power profiles 30 required for writing to one-time recordable media, such as DVD+/−R media, are shown. To form a mark 32 beginning at a track position t, a pulse 34 begins at a track position t-y. To end the mark 32 at a track position u, the pulse 34 is terminated at a track position u-x. In other words, adjustment of the laser power 30 is offset from a desired position of the mark 32 as a result of heat diffusion non-linearity. The position offsets y and x (corresponding to pulse timing edges 36 and 38, respectively) may depend on various factors, including, but not limited to, the laser power 30, the media type, and/or the write speed.

Referring now to FIGS. 5A and 5B, typical laser power profiles 40 required for writing to rewritable media, such as DVD+/−RW media, are shown. Write pulses 42 are greater than both a cooling power level 44 and an erase power level 46. Similar to the laser profiles 30 as shown in FIGS. 4A through 4D, the pulses 42 begin prior to a desired initial position t of a mark 48 and terminate prior to a desired end position u of the mark 48.

Because of the non-linear nature of heat-based writing to optical media, the various power levels and pulse timing edges must be calibrated according to individual desired mark lengths (i.e. on a per mark-length basis). Further, the calibration is dependent on leading and trailing spaces adjacent to and on either side of the mark. In encoding schemes used in current optical media recording standards, both the marks and spaces may range from 3T to 14T in length, where T is a channel bit period.

A write strategy table located on the optical drive stores data entries specifying how a particular mark length should be formed. In other words, because the recording process is non-linear, the write strategy table includes the laser power, pulse timing edges, and other relevant data for each mark length. Typically, the write strategy table is stored in a non-volatile memory module, such as a flash memory module, that is located on the optical drive.

Constructing the write strategy table typically requires a calibration sequence that is dependent on both media type (e.g. the manufacturer of the media) and the write speed. The calibration sequence is conducted during manufacturing for each optical media playback device. Further, the calibration sequence includes data to account for all possible known media types that are available to a potential user of the optical media playback device and is stored on the nonvolatile memory module.

When new media types are introduced by media manufacturers, however, the write strategy table must be updated. For example, a user may download (e.g. from the Internet) new firmware that includes an updated write strategy table from the manufacturer. When Internet access is not available, the user may need to acquire an update disk from the manufacturer via mail. In certain circumstances, a user may inadvertently obtain counterfeit or off-specification media that can not be properly written with the original write strategy table. Therefore, no amount of updating from the drive manufacturer can solve the resulting write problems. Often, consumers purchase optical media playback devices such as DVD drives and attempt to operate the drives with low-cost media. When the consumers discover that the drives are not able to write or read the media properly, many return the drive the store, resulting in increased costs to drive manufacturers.

SUMMARY

A write strategy calibration system for an optical media playback device includes memory for storing a write strategy table. A control module generates a write signal to write a training pattern to an optical storage medium according to calibration data stored in the write strategy table. A write strategy analysis module receives a read signal indicative of the training pattern written to the optical storage medium and adjusts the calibration data according to the read signal.

In other features of the invention, the training pattern includes a preamble pattern and a main data sequence, each comprising mark and space patterns indicative of binary data. The training pattern includes a sync mark that is indicative of an end of the preamble pattern and a beginning of the main data sequence. The main data sequence includes mark and space patterns representative of all possible combinations of mark and space lengths. The training pattern further includes a reference pattern interspersed in at least one of the training pattern and the main data sequence.

In other features of the invention, a timing module obtains a timing lock on the training pattern according to at least one of the preamble pattern and the reference pattern. The timing module obtains the timing lock on a first transition edge of the reference pattern. The first transition edge is one of a leading transition edge and a trailing transition edge of the reference pattern. A mark and space pattern forming the preamble pattern is equivalent to the reference pattern. The write strategy analysis module reads transition edges from the training pattern. At least one of the write strategy analysis module and the timing module selectively adjusts the timing lock. The write strategy analysis module includes the timing module.

In other features of the invention, an optical media playback device includes the write strategy calibration system. The optical media playback device is at least one of a compact disc (CD) recordable drive, a CD rewritable drive, a digital versatile disc (DVD) recordable drive, a DVD rewritable drive, a Blu-ray DVD drive, and an HD DVD drive. The write strategy table includes calibration data for known optical storage medium types. The optical media playback device rewrites the training pattern after adjusting the calibration data in the write strategy table. The write strategy table is stored in at least one of volatile memory and non-volatile memory. The write strategy table is implemented in firmware of the optical media playback device. The write strategy analysis module communicates with firmware of the optical media playback device to adjust the calibration data.

In other features of the invention, the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

A method of calibrating a write strategy for an optical media playback device includes storing a write strategy table, generating a write signal to write a training pattern to an optical storage medium according to calibration data stored in the write strategy table, receiving a read signal indicative of the training pattern written to the optical storage medium, and adjusting the calibration data according to the read signal.

In other features of the invention, the training pattern includes a preamble pattern and a main data sequence, each comprising mark and space patterns indicative of binary data. The training pattern includes a sync mark that is indicative of an end of the preamble pattern and a beginning of the main data sequence. The main data sequence includes mark and space patterns representative of all possible combinations of mark and space lengths. The training pattern further includes a reference pattern interspersed in at least one of the training pattern and the main data sequence.

In other features of the invention, the method further comprises obtaining a timing lock on the training pattern according to at least one of the preamble pattern and the reference patter. The step of obtaining includes obtaining the timing lock on a first transition edge of the reference pattern. The first transition edge is one of a leading transition edge and a trailing transition edge of the reference pattern. A mark and space pattern forming the preamble pattern is equivalent to the reference pattern.

In other features of the invention, the method further comprises reading transition edges from the training pattern. The method further comprises selectively adjusting the timing lock. The write strategy table includes calibration data for known optical storage medium types. The method further comprises rewriting the training pattern after adjusting the calibration data in the write strategy table. The step of storing includes storing the write strategy table in at least one of volatile memory and non-volatile memory. The write strategy table is implemented in firmware of the optical media playback device. The method further comprises communicating with firmware of the optical media playback device to adjust the calibration data.

In other features of the invention, the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

A write strategy calibration system for an optical media playback device includes memory means for storing a write strategy table, control means for generating a write signal to write a training pattern to an optical storage medium according to calibration data stored in the write strategy table, and write strategy analysis means for receiving a read signal indicative of the training pattern written to the optical storage medium and for adjusting the calibration data according to the read signal.

In other features of the invention, the training pattern includes a preamble pattern and a main data sequence, each comprising mark and space patterns indicative of binary data. The training pattern includes a sync mark that is indicative of an end of the preamble pattern and a beginning of the main data sequence. The main data sequence includes mark and space patterns representative of all possible combinations of mark and space lengths. The training pattern further includes a reference pattern interspersed in at least one of the training pattern and the main data sequence.

In other features of the invention, the write strategy calibration system includes timing means for obtaining a timing lock on the training pattern according to at least one of the preamble pattern and the reference pattern. The timing means obtains the timing lock on a first transition edge of the reference pattern. The first transition edge is one of a leading transition edge and a trailing transition edge of the reference pattern. A mark and space pattern forming the preamble pattern is equivalent to the reference pattern. The write strategy analysis means reads transition edges from the training pattern. At least one of the write strategy analysis means and the timing means selectively adjusts the timing lock. The write strategy analysis means includes the timing means.

In other features of the invention, an optical media playback device includes the write strategy calibration system. The optical media playback device is at least one of a compact disc (CD) recordable drive, a CD rewritable drive, a digital versatile disc (DVD) recordable drive, a DVD rewritable drive, a Blu-ray DVD drive, and an HD DVD drive. The write strategy table includes calibration data for known optical storage medium types. The optical media playback device rewrites the training pattern after adjusting the calibration data in the write strategy table. The write strategy table is stored in at least one of volatile memory and non-volatile memory. The write strategy table is implemented in firmware of the optical media playback device. The write strategy analysis means communicates with firmware of the optical media playback device to adjust the calibration data.

In other features of the invention, the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |

-continued

| Pattern | Purpose |
| --- | --- |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

A computer program executed by a processor that calibrates a write strategy for an optical media playback device includes storing a write strategy table, generating a write signal to write a training pattern to an optical storage medium according to calibration data stored in the write strategy table, receiving a read signal indicative of the training pattern written to the optical storage medium, and adjusting the calibration data according to the read signal.

In other features of the invention, the training pattern includes a preamble pattern and a main data sequence, each comprising mark and space patterns indicative of binary data. The training pattern includes a sync mark that is indicative of an end of the preamble pattern and a beginning of the main data sequence. The main data sequence includes mark and space patterns representative of all possible combinations of mark and space lengths. The training pattern further includes a reference pattern interspersed in at least one of the training pattern and the main data sequence.

In other features of the invention, the computer program further comprises obtaining a timing lock on the training pattern according to at least one of the preamble pattern and the reference pattern. The step of obtaining includes obtaining the timing lock on a first transition edge of the reference pattern. The first transition edge is one of a leading transition edge and a trailing transition edge of the reference pattern. A mark and space pattern forming the preamble pattern is equivalent to the reference pattern.

In other features of the invention, the computer program further comprises reading transition edges from the training pattern. The computer program further comprises selectively adjusting the timing lock. The write strategy table includes calibration data for known optical storage medium types. The computer program further comprises rewriting the training pattern after adjusting the calibration data in the write strategy table. The step of storing includes storing the write strategy table in at least one of volatile memory and non-volatile memory. The write strategy table is implemented in firmware of the optical media playback device. The computer program further comprises communicating with firmware of the optical media playback device to adjust the calibration data.

In other features of the invention, the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |

-continued

| Pattern | Purpose |
| --- | --- |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

In still other features, the systems and methods described above are implemented by a computer program executed by one or more processors. The computer program can reside on a computer readable medium such as but not limited to memory, nonvolatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
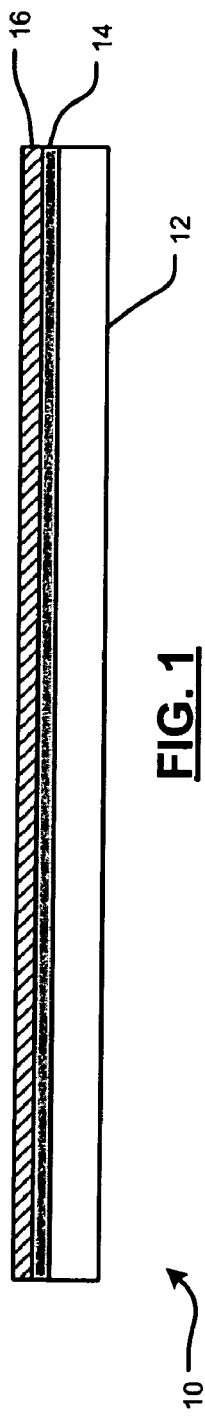
FIG. 1 is a cross-sectional view of a one-time recordable optical disc according to the prior art.
Figure 2:
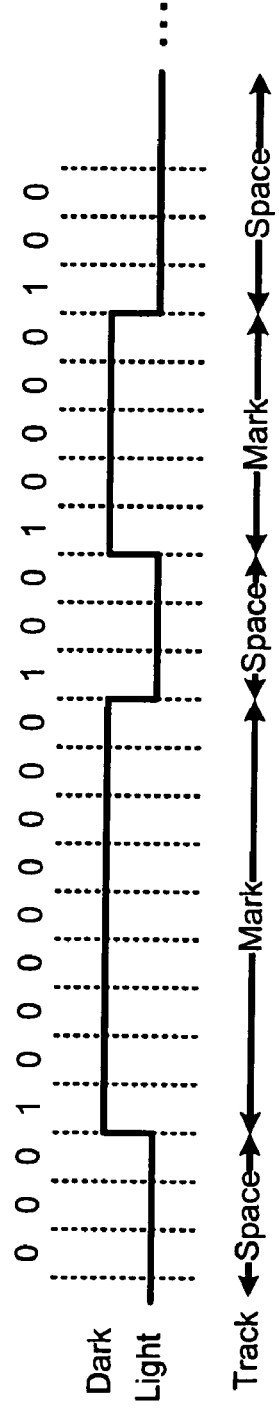
FIG. 2 illustrates exemplary mark/space and corresponding NRZI converted signals that are generated by an optical playback device reading an optical medium.
Figure 3:
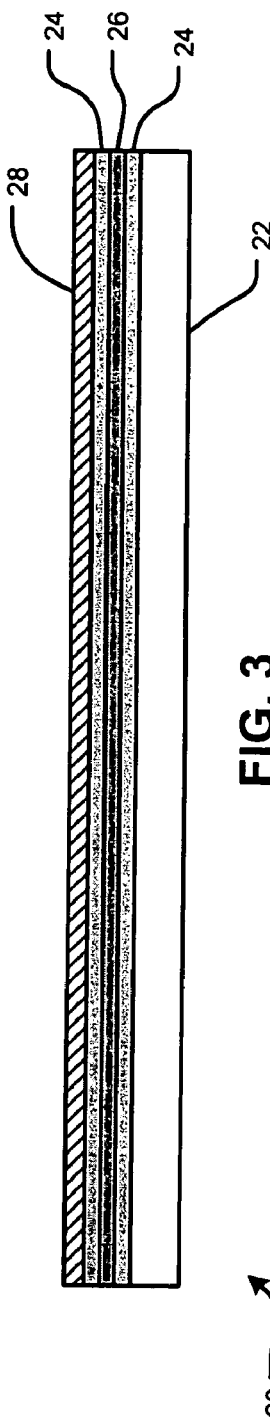
FIG. 3 is a cross-sectional view of a rewritable optical disc according to the prior art.
Figure 4A:
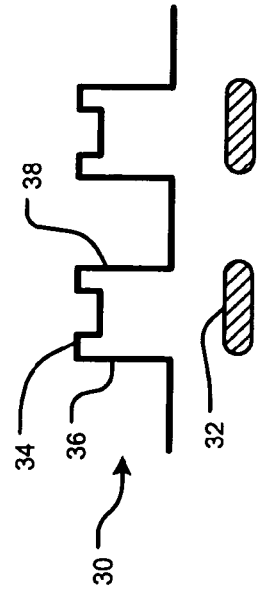
FIG. 4A illustrates a first exemplary laser power profile for writing to one-time recordable optical media according to the prior art.
Figure 4B:
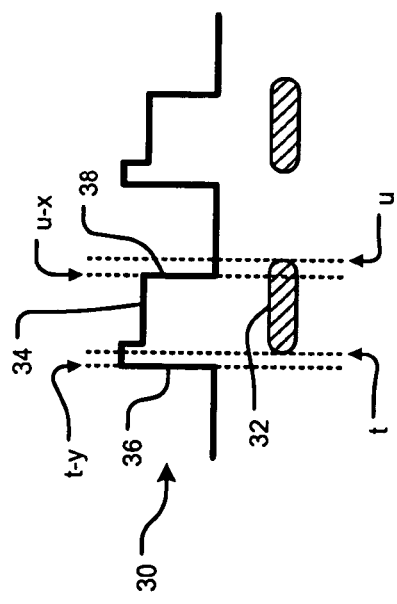
FIG. 4B illustrates a second exemplary laser power profile for writing to one-time recordable optical media according to the prior art.
Figure 4C:
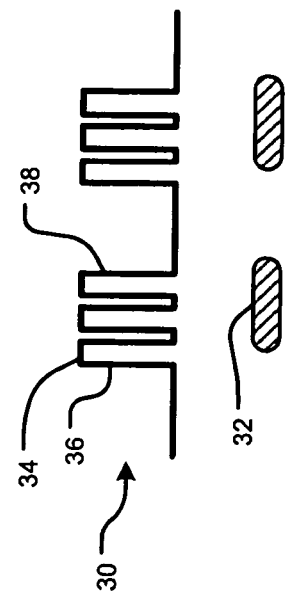
FIG. 4C illustrates a third exemplary laser power profile for writing to one-time recordable optical media according to the prior art.
Figure 4D:
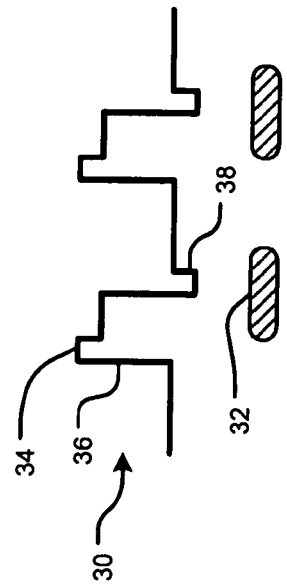
FIG. 4D illustrates a fourth exemplary laser power profile for writing to one-time recordable optical media according to the prior art.
Figures 5A, 5B:
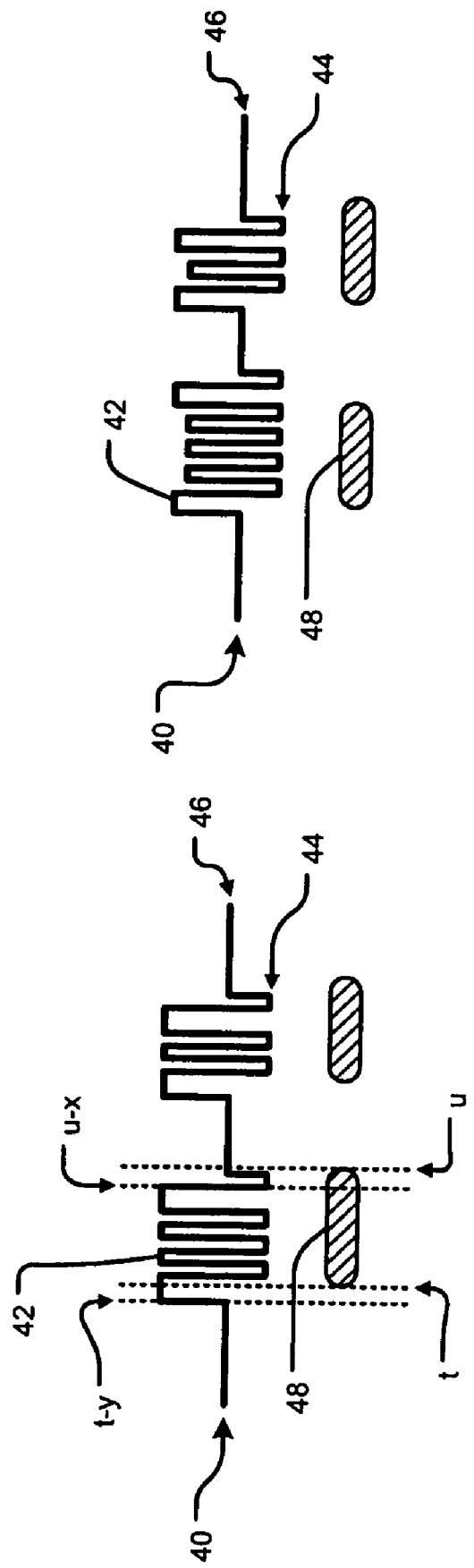
FIG. 5A illustrates a first exemplary laser power profile for writing to rewritable optical media according to the prior art.
FIG. 5B illustrates a second exemplary laser power profile for writing to rewritable optical media according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

The present invention allows optical media playback devices to adapt to various recordable and/or rewritable media types without having to rely on manufacturer or firmware updates. As a result, consumer satisfaction and the manufacturer's profitability are improved due to increased sales and a reduced product return rate.

More specifically, the present invention allows automated calibration of a write strategy table stored on an optical media playback device. The optical media playback device provides precise control of a write strategy laser pulses and precise measurement of data written by the write laser. In current optical media storage technology, precise control of write strategy pulses has been available for several generations of products. Conventionally, however, an integrated circuit or module that performs both the writing and precise measurement is not available. While precise measurement of a readback waveform can be accomplished using expensive instrumentation (e.g. a high speed digital sampling scope), such an implementation is limited to a factory, laboratory, or other high-cost manufacturing environment.

Figure 6:
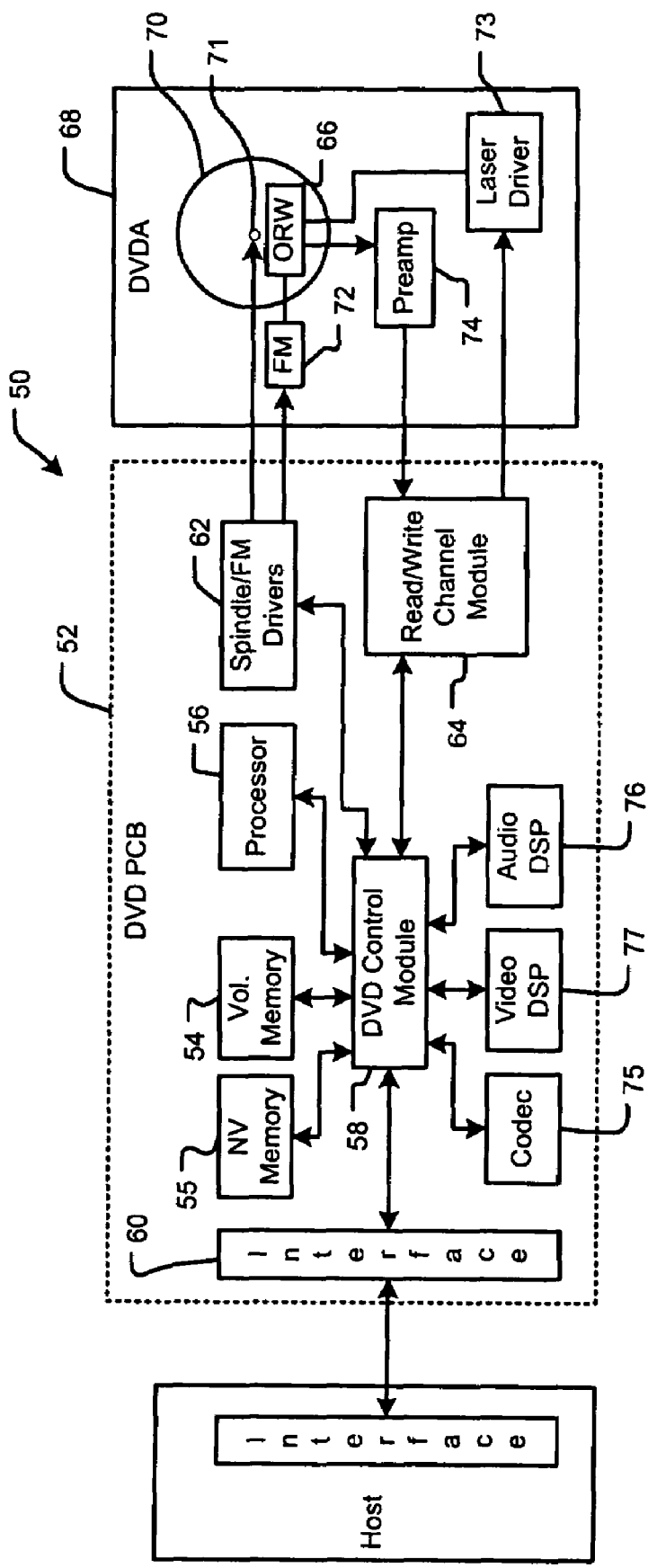
FIG. 6 is a functional block diagram of a optical media playback device including a write strategy table according to the present invention.

Referring now to FIG. 6, the present invention is implemented in an optical media playback device 50, such as a DVD system. The optical media playback device 50 is shown to include a DVD printed circuit board (PCB) 52, which includes a buffer 54 that stores read data, write data and/or volatile control code that is associated the control of the optical media playback device 50. The buffer 54 may employ volatile memory such as SDRAM or other types of low latency memory. Nonvolatile memory 55 such as flash memory can also be used for critical data such as data relating to DVD write formats and/or other nonvolatile control code. A processor 56 arranged on the DVD PCB 52 performs data and/or control processing that is related to the operation of the optical media playback device 50. The processor 56 also performs decoding of copy protection and/or compression/decompression as needed. A DVD control module 58 communicates with an input/output interface 60 and with a spindle/feed motor (FM) driver 62 and/or a read/write channel module 64. The DVD control module 58 coordinates control of the spindle/FM driver, the read/write channel module 64 and the processor 56 and data input/output via the interface 60.

During write operations, the read/write channel module 64 encodes the data to be written by an optical read/write (ORW) or optical read only (OR) device 66 to the DVD platter. The read/write channel module 64 processes the signals for reliability and may apply, for example, error checking and correcting (ECC) coding, run length limited (RLL) coding, and the like. During read operations, the read/write channel module 64 converts an analog output of the ORW or OR device 66 to a digital signal. The converted signal is then detected and decoded by known techniques to recover the data that was written on the DVD.

A DVD assembly (DVDA) 68 includes an optical storage medium 70, such as a DVD platter, that stores data optically. The optical storage medium 70 is rotated by a spindle motor that is schematically shown at 71. The spindle motor 71 rotates the optical storage medium 70 at a controlled and/or variable speed during the read/write operations. The ORW or OR device 66 moves relative to the optical storage medium 70 to read and/or write data to/from the optical storage medium 70. The ORW or OR device 66 typically includes a laser and an optical sensor.

For DVD read/write and DVD read only systems, the laser is directed at tracks on the optical storage medium 70 during read operations. The optical sensor senses reflections caused by the lands/pits. For DVD read/write (RW) applications, a laser may also be used to heat the die layer on the optical storage medium 70 during write operations.

The spindle/FM driver 62 controls the spindle motor 71, which controllably rotates the optical storage medium 70. The spindle/FM driver 62 also generates control signals that position a feed motor 72, for example using a voice coil actuator, a stepper motor or any other suitable actuator. The feed motor 72 typically moves the ORW or OR device 66 radially relative to the optical storage medium 70. A laser driver 73 generates a laser drive signal based on an output of the read/write channel module 64. The DVDA 68 includes a preamp circuit 74 that amplifies analog read signals. When reading data, the preamp circuit 74 amplifies low level signals from the ORW or OR device 66 and outputs the amplified signal to the read/write channel module 64.

The optical media playback device 50 further includes a codec module 75 that encodes and/or decodes video such as any of the MPEG formats. Audio and/or video digital signal processors and/or modules 76 and 77, respectively, perform audio and/or video signal processing, respectively.

Portions of the optical media playback device 50 may be implemented by one or more integrated circuits (IC) or chips. For example, the processor 56 and the DVD control module 58 may be implemented by a single chip. The spindle/FM driver 62 and/or the read/write channel module 64 may also be implemented by the same chip as the processor 56, the DVD control module 58 and/or by additional chips. Most of the optical media playback device 50 other than the DVDA 68 may also be implemented as a SOC.

The optical media playback device 50 stores and dynamically updates a write strategy table. For example, the optical media playback device 50 may store the write strategy table in the volatile memory 54 and/or in the nonvolatile memory 55. The write strategy table includes calibration data. The optical media playback device 50 writes to the optical storage medium 70 (via the read/write channel module 64 and/or the laser driver 73) according to the calibration data stored in the write strategy table. The optical media playback device 50 updates the calibration data stored in the write strategy table according to a particular type of optical storage medium 70 being used. Therefore, externally-initiated updates of the calibration data are not necessary.

To update the write strategy table, the optical media playback device 50 initially writes a training pattern to the optical storage medium 70 according to an initial write strategy. The training pattern may include data representative of all possible mark and space length combinations. The initial write strategy may include laser power or other data according to a known optical medium type. For example, initial write strategies for known medium types may be stored in firmware (e.g. the nonvolatile memory 55) and/or stored on the optical storage medium 70. For unknown medium types, the initial write strategy may be estimated. For example, the initial write strategy may be a default write strategy stored in firmware and/or a previously used write strategy.

The optical media playback device 50 then reads back the written training pattern (via the ORW or OR device 66 and/or the read/write channel module 64) from the optical storage medium 70. The optical media playback device 50 analyzes the written training pattern to determine whether the mark and space lengths and locations correspond to the intended lengths and locations of the pattern. In other words, the optical media playback device 50 determines distances that the marks and spaces are offset from the intended locations. Based on the offset distances, the optical media playback device 50 adjusts the write strategy table to incrementally correct the calibration data. For example, the optical media playback device 50 may adjust the write strategy table to reflect whether the written marks were too long or too short according to the initial strategy.

The optical media playback device 50 rewrites the training pattern to the optical storage medium 70 according to the updated write strategy table, and rereads the written training pattern for analysis. The optical media playback device 50 repeats this procedure until the write strategy is determined to be acceptable.

Figure 7:
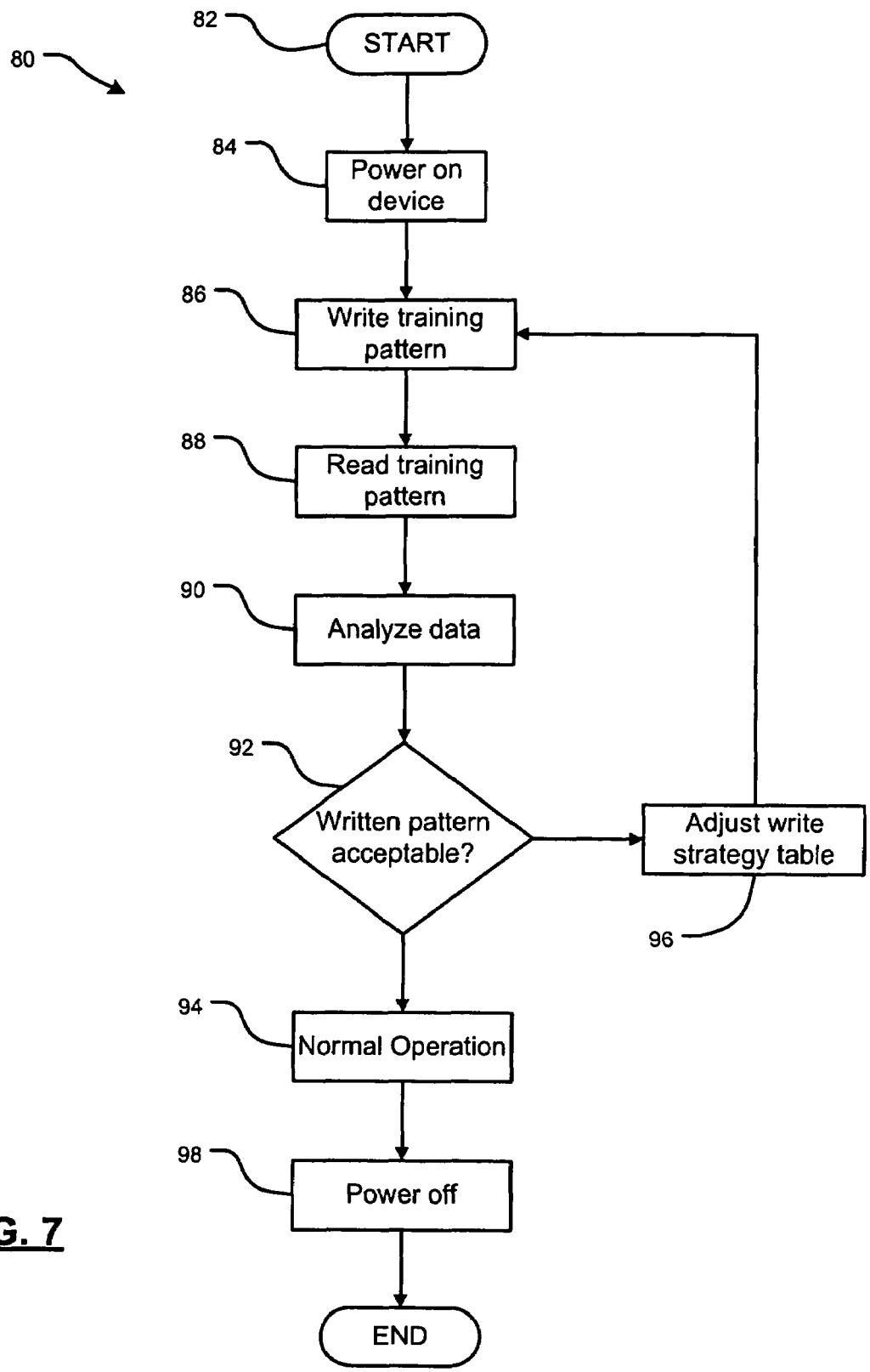
FIG. 7 illustrates steps of an automatic write strategy calibration method according to the present invention.

Referring now to FIG. 7, an automatic write strategy calibration method 80 begins in step 82. In step 84, an optical media playback device 50 that implements the method 80 powers on. In step 86, the optical media playback device 50 writes the training pattern to the optical storage medium 70. In step 88, the optical media playback device 50 reads the-written training pattern from the optical storage medium 70. In step 90, the optical media playback device 50 analyzes the written training pattern to determine offsets of the data. In step 92, the optical media playback device 50 determines whether the written training pattern is acceptable according to the offsets. If true, the method 80 continues to step 94. If false, the method 80 continues to step 96.

In step 94, the optical media playback device 50 continues with normal operation. For example, the optical media playback device 50 may write data to the optical storage medium 70 according to the current write strategy table. The optical media playback device 50 may continue to operate until powering off in step 98 and/or until a new optical storage medium 70 is presented.

In step 96, the optical media playback device 50 adjusts the write strategy table according to the analysis of the written training pattern. The method 80 then continues to step 86. In this manner, the method 80 continues to adjust the write strategy table and analyze the resulting training pattern until an acceptable write strategy is found.

Figure 8:
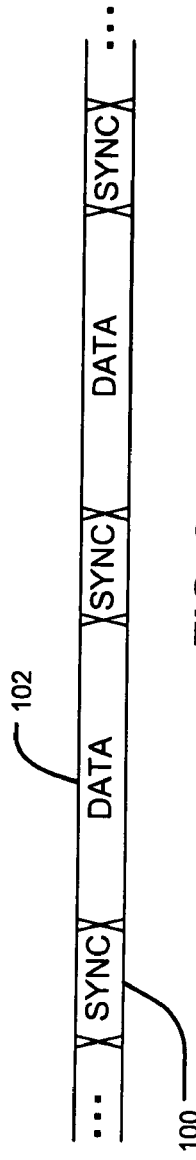
FIG. 8 illustrates exemplary alternating sync patterns and data blocks according to the present invention.
Figure 9:
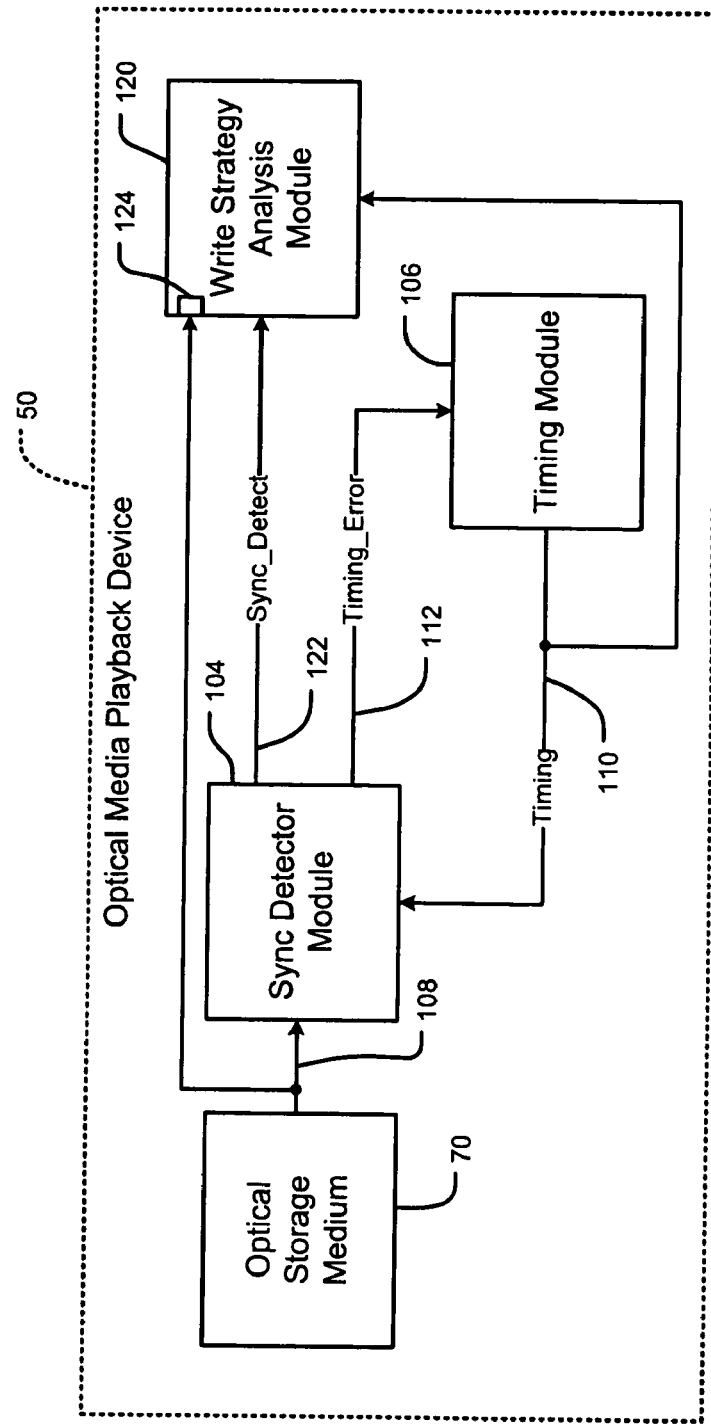
FIG. 9 is a functional block diagram of an exemplary optical media playback device including a write strategy analysis module according to the present invention.

Referring now to FIGS. 8 and 9, operation of the optical media playback device 50 is described in further detail. The data that is stored on the optical storage medium 70 typically includes alternating sync patterns 100 and data blocks 102. The sync patterns 100 are used to identify the data blocks 102. In other words, the optical media playback device 50 must be able to identify the location of the sync patterns 100 so that the corresponding data block 102 can be read properly.

The optical media playback device 50 may include a sync detector module 104 and a timing module 106. For example, the sync detector module 104 and/or the timing module 106 may be located on the read/write channel module 64, the DVD control module 58, and/or elsewhere on the DVD PCB 52 as described in FIG. 6. The sync detector module 104 is used to identify the sync patterns 100. More specifically, the sync detector module 104 receives read-back data 108 read from the optical storage medium 70 and identifies transition edges in the sync patterns 100. The timing module 106 generates a timing signal 110 for the sync detector module 104 and/or other modules located within the optical media playback device 50. The sync detector module 104 generates a timing error signal 112 to adjust a timing loop of the timing module 106. In this manner, the timing loop can lock on to transition edges within the written pattern. For example, the timing loop may lock on to leading and/or trailing transition edges within the written pattern.

The optical media playback device 50 further includes a write strategy analysis module 120. For example, the write strategy analysis module 120 may be located on the read/write channel module 64, the DVD control module 58, and/or elsewhere on the DVD PCB 52 as described in FIG. 6. The write strategy analysis module 120 receives a sync detect signal 122 from the sync detector module 104, the read-back data 108, and the timing signal 110 from the timing module 106. The write strategy analysis module 120 determines when to receive the data block 102 according to the sync detect signal 122. The write strategy analysis module 120 receives the transition edges within the data block 102 accordingly. For example, the write strategy analysis module 120 may receive the read-back data 108 on a digital channel 124. Read-back parameters for the digital channel 124 may be selected according to a particular ORW or OR device that is used to read the data from the optical storage medium 70. Appropriate settings for the parameters can be determined according to prior calibration attempts. In another implementation, the write strategy analysis module 120 comprises the timing module 106 and/or the sync detector module 104.

The write strategy analysis module 120 subsequently analyzes the marks and spaces of the written training pattern as described in FIGS. 6 and 7. Alternatively, analysis of the transition edges and the written training pattern may be performed by an analysis program stored in firmware of the optical media playback device 50. The write strategy analysis module 120 (and/or the firmware) updates the write strategy table according to the analysis.

Figure 10:
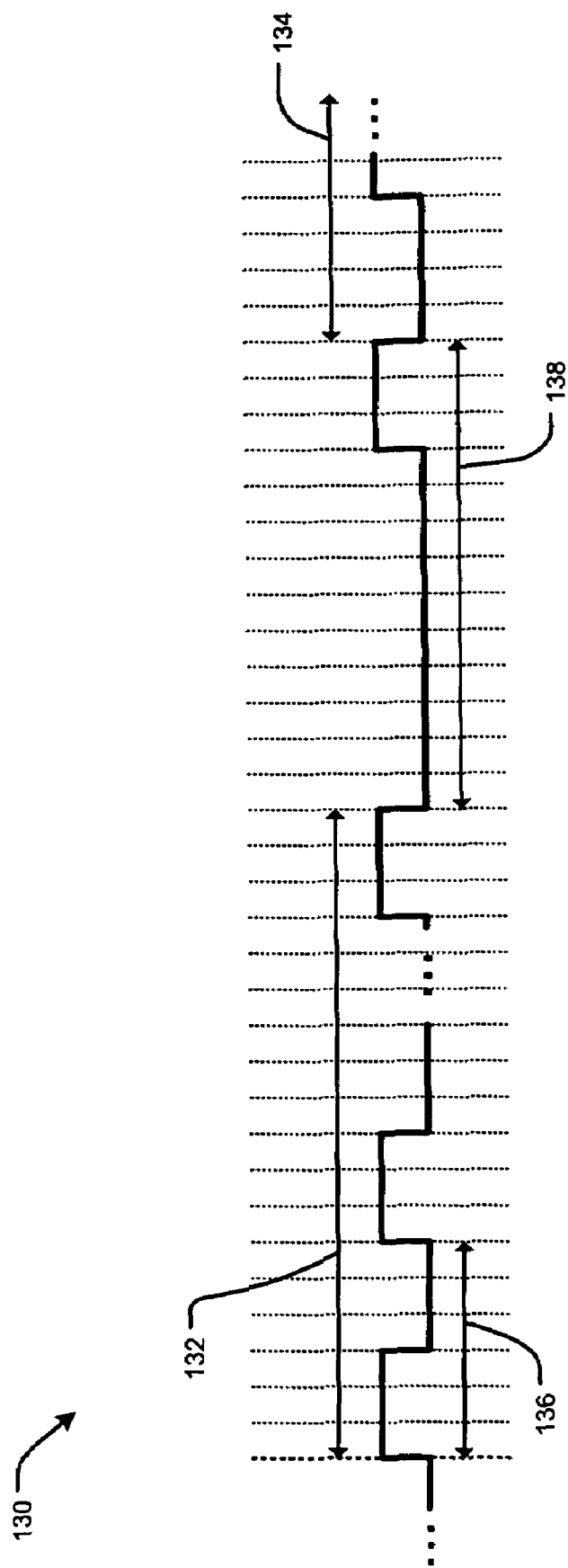
FIG. 10 illustrates an exemplary training pattern according to the present invention.

Referring now to FIG. 10, the optical media playback device 50 writes an exemplary training pattern 130 as shown. The training pattern 130 includes a preamble pattern 132 and a main data sequence 134. The preamble pattern 132 corresponds to the sync pattern 100 as described in FIG. 8, and may include a reference pattern 136 that is interspersed among the preamble pattern 132. The preamble pattern 132 is provided to allow the sync detector module 104 and the timing module 106 to lock the timing loop onto leading edges 136 of the training pattern 130 (and the reference pattern 136). A sync mark 138 indicates an end of the preamble pattern 132 and a beginning of the main data sequence 134. The preamble pattern 132 and/or the reference pattern 136 may be formed according to minimum transition spacing of the optical media playback device 50 and/or the optical storage medium 70. For example, the minimum transition spacing for current standard DVDs using red lasers is 3T (3 channel bit periods) for both space and mark lengths. Those skilled in the art can appreciate that other spacings of the preamble pattern 132 and the reference pattern 136 are possible. As shown, the preamble pattern 132 is 3S/3M, 3S/3M, 3S/3M, . . . , 3S/3M, where a notation xS/yM indicates a pattern including a space having a length of xT followed by a mark having a length of yT. The sync mark 138, as shown, is 10S/3M.

The main data sequence 134 includes data representative of all possible mark and space length combinations. For example, the main data sequence includes mark and space length combinations according to the following exemplary table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration |

The above table demonstrates a main data sequence 134 that includes space lengths up to and including 5T and mark lengths up to and including 14T. In other words, the above table assumes that space lengths greater than 5T have no effect on mark formation. However, those skilled in the art can appreciate that the main data sequence 134 may include larger space lengths, such as 6T, 7T, . . . , and/or 14T. Further, the main data sequence 134 may include patterns representative of trailing space lengths (i.e. patterns representative of spaces following marks). In the present implementation, the main data sequence 134 is arranged to be substantially DC free to allow the use of AC coupling to remove channel offsets. As a result, processing of the read-back data is simplified. In another implementation, an AC/DC coupling circuit may be included as described in U.S. patent application Ser. No. 11/185,563, filed on Jul. 20, 2005, which is hereby incorporated by reference in its entirety.

The main data sequence 134 may include a redundant pattern for DC balancing as shown in the above table. The redundant pattern is configured to allow the timing loop to lock in on a DC offset signal. For example, the redundant pattern may include an alternating bit pattern such as 1010101. The DC offset signal can then be eliminated.

As described in FIGS. 8, 9, and 10, the timing loop locks on to transition edges within the training pattern 130. During the calibration process, the timing loop preferably locks on to a transition edge having the least amount of uncertainty. In the present implementation, the initially selected transition edge is the leading edge of the 3T mark, and the timing loop attempts to lock on to the leading edge of the 3T mark during read-back of the 3S/3M preamble. As such, the timing loop should complete the timing lock prior to detecting the sync mark 138.

As the digital channel 124 of the write strategy analysis module 120 starts to process the 4S/3M and 5S/3M data during read-back of the main data sequence 134, a trailing transition location of the 3T marks can be measured for different spacing histories. For example, the trailing edge of a 3T mark preceding a 4T space can be measured according to an analysis of the 3S/3M, 4S/3M pattern. Similarly, the trailing edge of a 3T mark preceding a 5T space can be measured according to an analysis of the 3S/3M, 5S/3M pattern. After these initial measurements, the timing loop can be locked to the trailing edge of any 3T mark in the main data sequence, and the trailing transition edges of the remainder of the data patterns can be measured. Alternatively, the timing loop can remain locked to the leading edges of the 3T marks throughout the entire read-back process, and/or locked to leading edges of the 3T marks at a lowered bandwidth. The write strategy table is updated according to the measurements and analyses of all patterns included in the main data sequence 134.

In another implementation, the optical media playback device 50 may adjust the power (e.g. from a minimum power level to a maximum power level) and the timing of the write laser for a particular pattern until a particular desired result is achieved. For example, the optical media playback device 50 may adjust the power and timing of the write laser for the 3S/3M pattern of the preamble pattern 132. In this manner, power levels and timing necessary to achieve a maximum contrast (i.e. peak to peak measurement) and/or a optimum duty cycle (e.g. 50% duty cycle) can be determined.

Figure 11B:
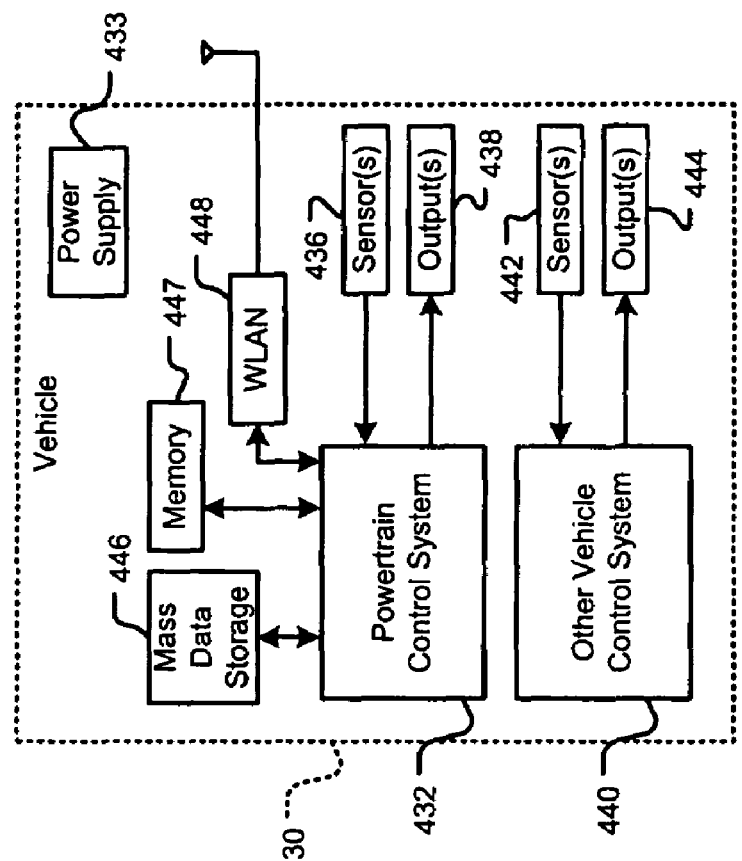
FIG. 11B is a functional block diagram of a vehicle control system.
Figure 11A:
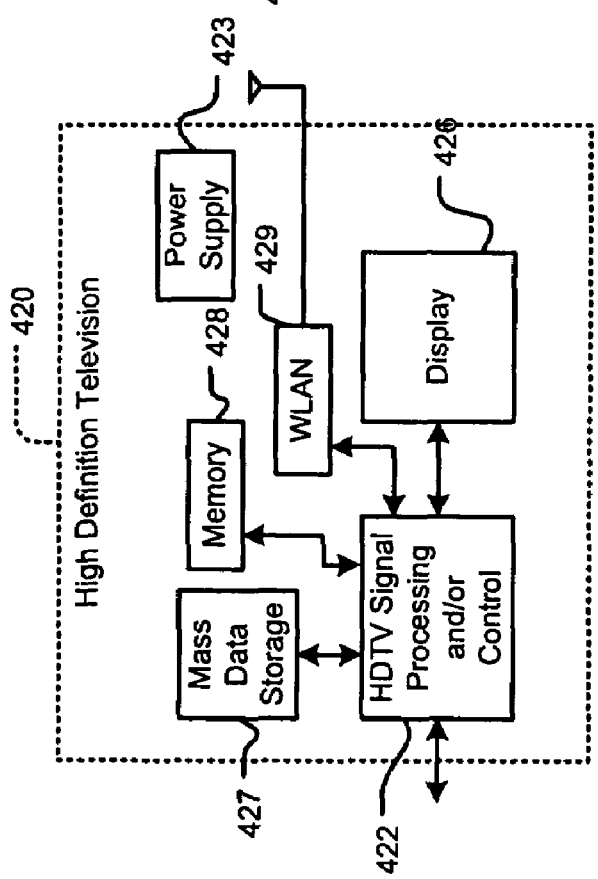
FIG. 11A is a functional block diagram of a high definition television.

Referring now to FIG. 11A, the present invention can be implemented in a high definition television (HDTV) 420 that includes either or both signal processing and/or control circuits, which are generally identified at 422, a WLAN interface, mass data storage of the HDTV 420 and/or a power supply 423. The present invention may implement and/or be implemented in the mass data storage 427. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical storage devices. The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 11B, a vehicle 430 includes a vehicle control system and a power supply 433. The present invention may implement and/or be implemented in mass data storage of the vehicle control system. Vehicle control system implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, and/or a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices such as hard disk drives HDD and/or DVDs. The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 11C:
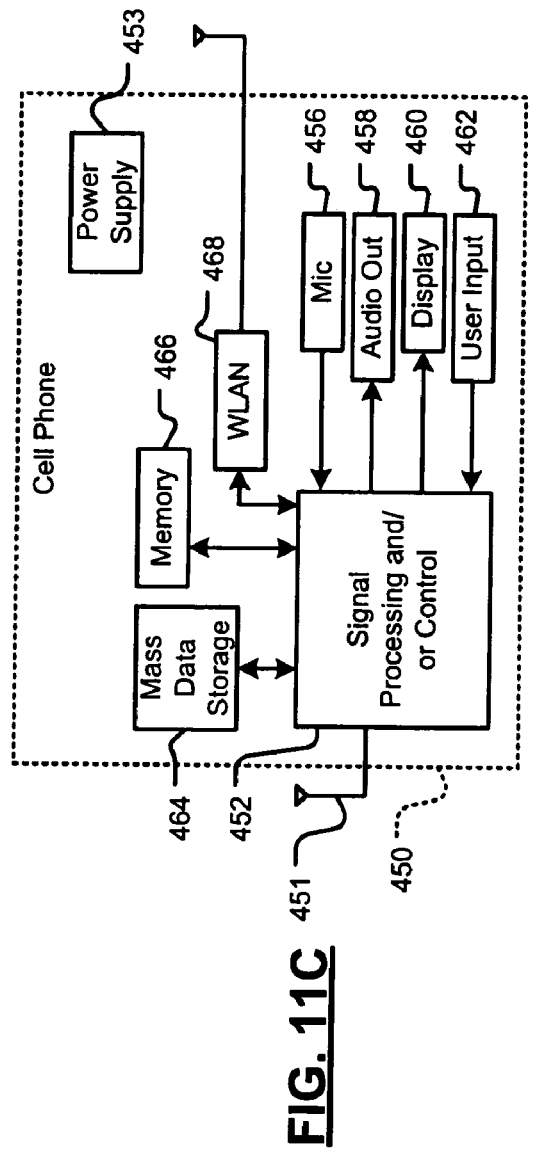
FIG. 11C is a functional block diagram of a cellular phone.

Referring now to FIG. 11C, the present invention can be implemented in a cellular phone 450 that may include a cellular antenna 451. The cellular phone 450 includes either or both signal processing and/or control circuits, which are generally identified at 452, a WLAN interface, mass data storage of the cellular phone 450 and/or a power supply 453. The present invention may implement and/or be implemented in the mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 11D:
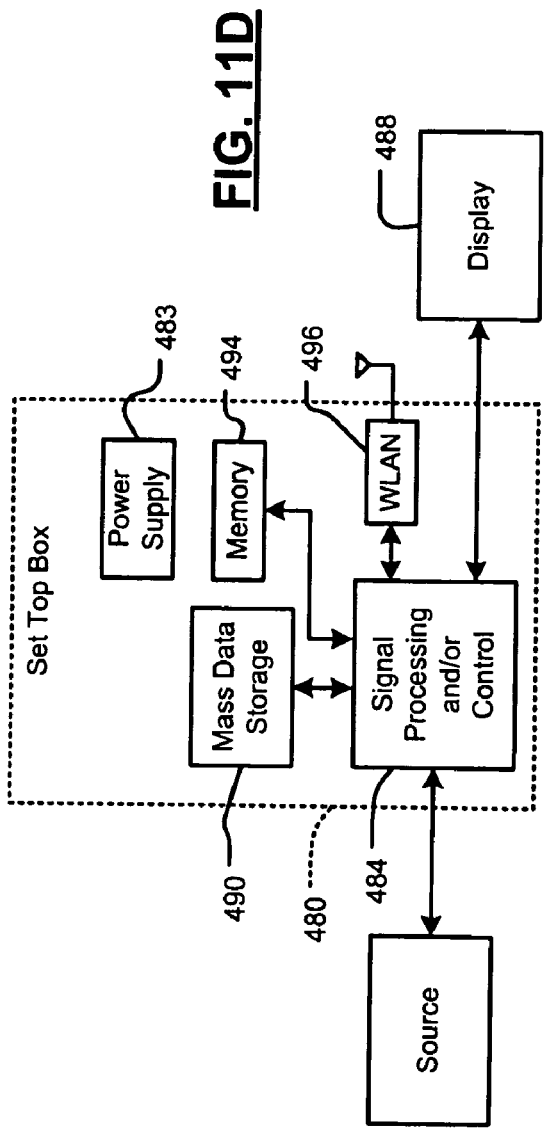
FIG. 11D is a functional block diagram of a set top box.

Referring now to FIG. 11D, the present invention can be implemented in a set top box 480. The set top box 480 includes either or both signal processing and/or control circuits, which are generally identified at 484, a WLAN interface, mass data storage of the set top box 480 and/or a power supply 483. The present invention may implement and/or be implemented in the mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 11E:
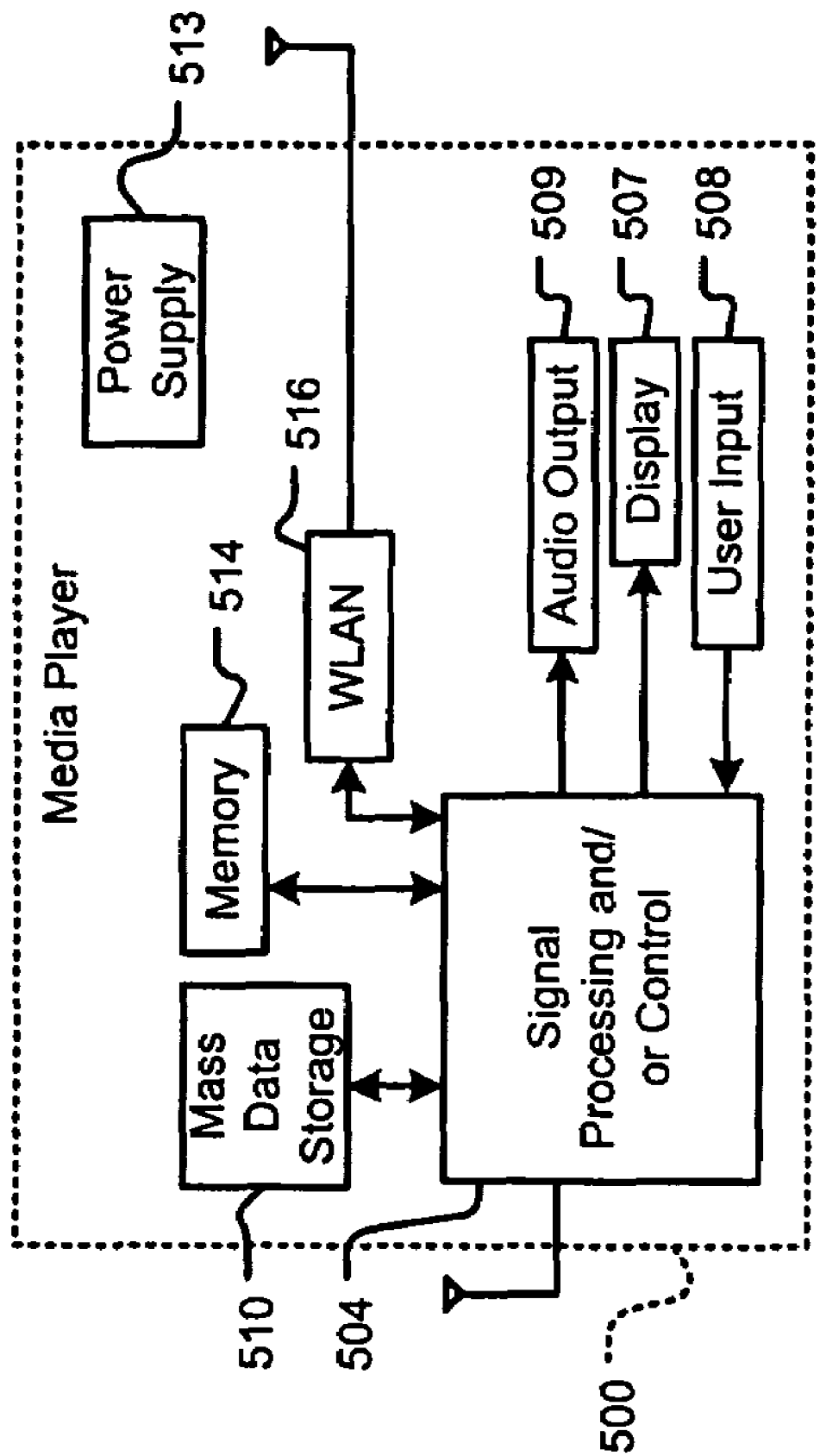
FIG. 11E is a functional block diagram of a media player.

Referring now to FIG. 11E, the present invention can be implemented in a media player 500. The media player 500 includes either or both signal processing and/or control circuits, which are generally identified at 504, a WLAN interface, mass data storage of the media player 500 and/or a power supply 503. The present invention may implement and/or be implemented in the mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A write strategy calibration system for an optical media playback device, the write strategy calibration system comprising:
   memory for storing a write strategy table;
   a control module that generates a write signal to write a training pattern to an optical storage medium according to calibration data stored in the write strategy table, wherein the training pattern includes mark and space patterns representative of all possible combinations of mark and space lengths; and
   a write strategy analysis module that receives a read signal indicative of the training pattern written to the optical storage medium, that determines data offsets based on the read signal, and that adjusts the calibration data according to the data offsets.

2. The write strategy calibration system of claim 1 wherein the training pattern includes a preamble pattern and a main data sequence, each comprising mark and space patterns indicative of binary data.

3. The write strategy calibration system of claim 2 wherein the training pattern includes a sync mark that is indicative of an end of the preamble pattern and a beginning of the main data sequence.

4. The write strategy calibration system of claim 2 wherein the training pattern further includes a reference pattern interspersed in at least one of the training pattern and the main data sequence.

5. The write strategy calibration system of claim 4 further comprising a timing module that obtains a timing lock on the training pattern according to at least one of the preamble pattern and the reference pattern.

6. The write strategy calibration system of claim 5 wherein the timing module obtains the timing lock on a first transition edge of the reference pattern.

7. The write strategy calibration system of claim 6 wherein the first transition edge is one of a leading transition edge and a trailing transition edge of the reference pattern.

8. The write strategy calibration system of claim 4 wherein a mark and space pattern forming the preamble pattern is equivalent to the reference pattern.

9. The write strategy calibration system of claim 1 wherein the write strategy analysis module reads transition edges from the training pattern.

10. The write strategy calibration system of claim 5 wherein at least one of the write strategy analysis module and the timing module selectively adjusts the timing lock.

11. The write strategy calibration system of claim 5 wherein the write strategy analysis module includes the timing module.

12. An optical media playback device comprising the write strategy calibration system of claim 1.

13. The optical media playback device of claim 12 wherein the optical media playback device is at least one of a compact disc (CD) recordable drive, a CD rewritable drive, a digital versatile disc (DVD) recordable drive, a DVD rewritable drive, a Blu-ray DVD drive, and an HD DVD drive.

14. The write strategy calibration system of claim 1 wherein the write strategy table includes calibration data for known optical storage medium types.

15. The write strategy calibration system of claim 1 wherein the optical media playback device rewrites the training pattern after adjusting the calibration data in the write strategy table.

16. The write strategy calibration system of claim 1 wherein the write strategy table is stored in at least one of volatile memory and non-volatile memory.

17. The write strategy calibration system of claim 1 wherein the write strategy table is implemented in firmware of the optical media playback device.

18. The write strategy calibration system of claim 1 wherein the write strategy analysis module communicates with firmware of the optical media playback device to adjust the calibration data.

19. A write strategy calibration system for an optical media playback device, the write strategy calibration system comprising:
   memory for storing a write strategy table;
   a control module that generates a write signal to write a training pattern to an optical storage medium according to calibration data stored in the write strategy table; and
   a write strategy analysis module that receives a read signal indicative of the training pattern written to the optical storage medium, that determines data offsets based on the read signal, and that adjusts the calibration data according to the data offsets,
   wherein the training pattern includes a preamble pattern and a main data sequence, each comprising mark and space patterns indicative of binary data; and
   wherein the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |

-continued

| Pattern | Purpose |
| --- | --- |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

20. A method of calibrating a write strategy for an optical media playback device, the method comprising:
storing a write strategy table;
generating a write signal to write a training pattern to an optical storage medium according to calibration data stored in the write strategy table, wherein the training patterns includes mark and space patterns representative of all possible combinations of mark and space lengths;
receiving a read signal indicative of the training pattern written to the optical storage medium;
determining data offsets based on the read signal; and
adjusting the calibration data according to the data offsets.

21. The method of claim 20 wherein the training pattern includes a preamble pattern and a main data sequence, each comprising mark and space patterns indicative of binary data.

22. The method of claim 21 wherein the training pattern includes a sync mark that is indicative of an end of the preamble pattern and a beginning of the main data sequence.

23. The method of claim 21 wherein the training pattern further includes a reference pattern interspersed in at least one of the training pattern and the main data sequence.

24. The method of claim 23 further comprising obtaining a timing lock on the training pattern according to at least one of the preamble pattern and the reference pattern.

25. The method of claim 24 wherein the step of obtaining includes obtaining the timing lock on a first transition edge of the reference pattern.

26. The method of claim 25 wherein the first transition edge is one of a leading transition edge and a trailing transition edge of the reference pattern.

27. The method of claim 23 wherein a mark and space pattern forming the preamble pattern is equivalent to the reference pattern.

28. The method of claim 20 further comprising reading transition edges from the training pattern.

29. The method of claim 24 further comprising selectively adjusting the timing lock.

30. The method of claim 20 wherein the write strategy table includes calibration data for known optical storage medium types.

31. The method of claim 20 further comprising rewriting the training pattern after adjusting the calibration data in the write strategy table.

32. The method of claim 20 wherein the step of storing includes storing the write strategy table in at least one of volatile memory and non-volatile memory.

33. The method of claim 20 wherein the write strategy table is implemented in firmware of the optical media playback device.

34. The method of claim 20 further comprising communicating with firmware of the optical media playback device to adjust the calibration data.

35. A method of calibrating a write strategy for an optical media playback device, the method comprising:
storing a write strategy table;
generating a write signal to write a training pattern to an optical storage medium according to calibration data stored in the write strategy table;
receiving a read signal indicative of the training pattern written to the optical storage medium;
determining data offsets based on the read signal; and
adjusting the calibration data according to the data offsets,
wherein the training pattern includes a preamble pattern and a main data sequence, each comprising mark and space patterns indicative of binary data; and
wherein the training pattern includes the main data sequence comprising mark and space combinations according to the following table:

| Pattern | Purpose |
| --- | --- |
| 3S/3M, 4S/3M | 4S/3M Calibration |
| 3S/3M, 3S/4M | 3S/4M Calibration |
| 3S/3M, 5S/3M | 5S/3M Calibration |
| 3S/4M, 3S/4M | Redundant Pattern for DC Balancing |
| 3S/3M, 4S/4M | 4S/4M Calibration |
| 3S/4M, 5S/4M | 5S/4M Calibration |
| 5S/3M, 3S/5M | 3S/5M Calibration |
| 4S/3M, 4S/5M | 4S/5M Calibration |
| 3S/3M, 5S/5M | 5S/5M Calibration |
| 6S/3M, 3S/6M | 3S/6M Calibration |
| 5S/3M, 4S/6M | 4S/6M Calibration |
| 4S/3M, 5S/6M | 5S/6M Calibration |
| 7S/3M, 3S/7M | 3S/7M Calibration |
| 6S/3M, 4S/7M | 4S/7M Calibration |
| 5S/3M, 5S/7M | 5S/7M Calibration |
| 8S/3M, 3S/8M | 3S/8M Calibration |
| 7S/3M, 4S/8M | 4S/8M Calibration |
| 6S/3M, 5S/8M | 5S/8M Calibration |
| 9S/3M, 3S/9M | 3S/9M Calibration |
| 8S/3M, 4S/9M | 4S/9M Calibration |
| 7S/3M, 5S/9M | 5S/9M Calibration |
| 10S/3M, 3S/10M | 3S/10M Calibration |
| 9S/3M, 4S/10M | 4S/10M Calibration |
| 8S/3M, 5S/10M | 5S/10M Calibration |
| 11S/3M, 3S/11M | 3S/11M Calibration |
| 10S/3M, 4S/11M | 4S/11M Calibration |
| 9S/3M, 5S/11M | 5S/11M Calibration |
| 12S/3M, 3S/12M | 3S/12M Calibration |
| 11S/3M, 4S/12M | 4S/12M Calibration |
| 10S/3M, 5S/12M | 5S/12M Calibration |
| 13S/3M, 3S/13M | 3S/13M Calibration |
| 12S/3M, 4S/13M | 4S/13M Calibration |
| 11S/3M, 5S/13M | 5S/13M Calibration |
| 14S/3M, 3S/14M | 3S/14M Calibration |
| 13S/3M, 4S/14M | 4S/14M Calibration |
| 12S/3M, 5S/14M | 5S/14M Calibration | wherein a mark and space combination of xS/yM includes a space having a length of x and a mark having a length of y, x and y are integers, and the training pattern further includes the redundant pattern for DC balancing.

* * * * *